Aug. 16, 1932.                E. J. MAUST                1,872,480
                     MAKING CEMENT ASBESTOS PRODUCTS
                           Filed July 17, 1931
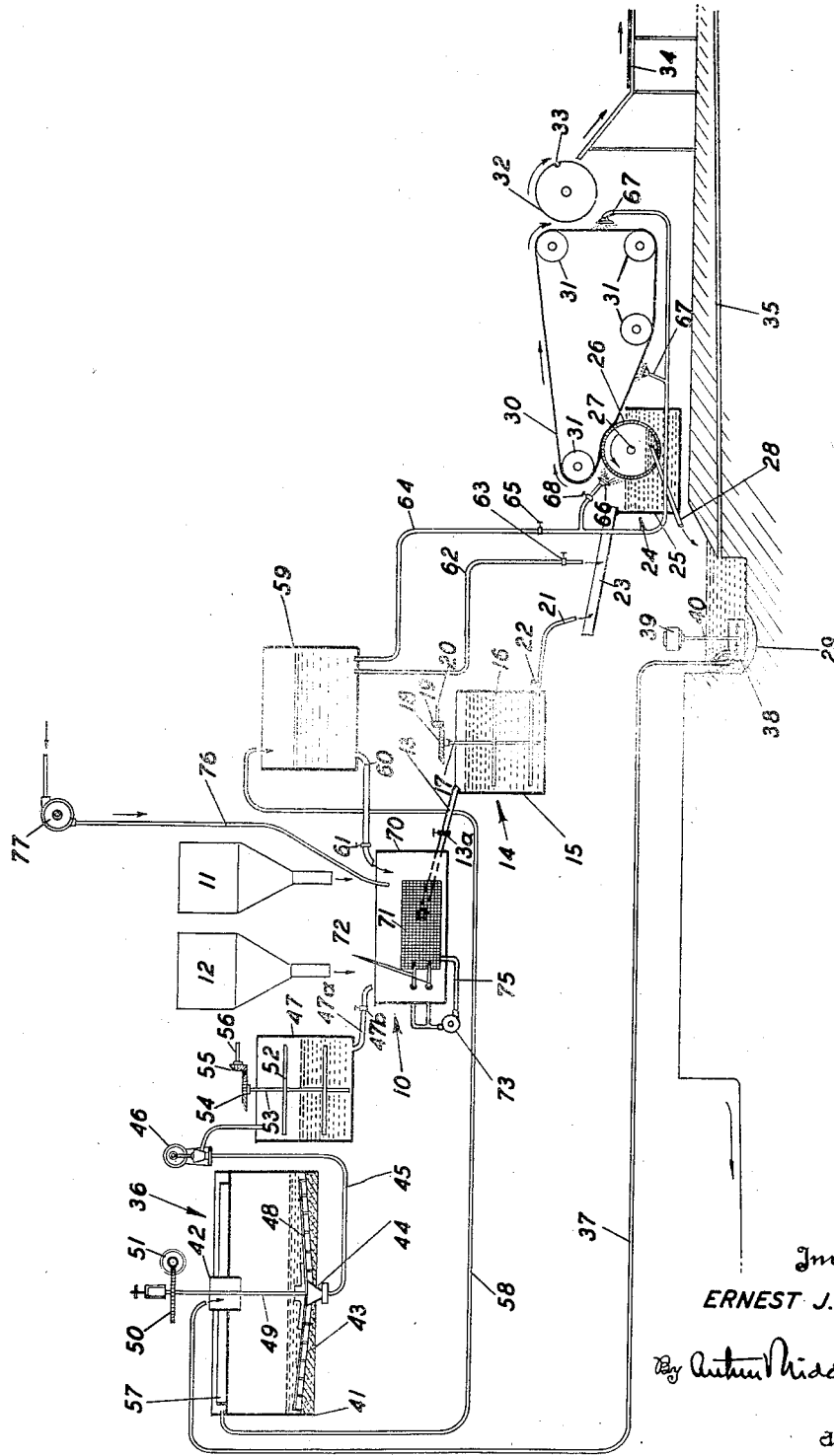
Inventor
ERNEST J. MAUST Patented Aug. 16, 1932

1,872,480

UNITED STATES PATENT OFFICE

ERNEST J. MAUST, OF NEW YORK, N. Y., ASSIGNOR TO THE DORR COMPANY, INC., OF NEW YORK, N. Y., A CORPORATION OF DELAWARE

MAKING CEMENT-ASBESTOS PRODUCTS

Application filed July 17, 1931. Serial No. 551,440.

This invention relates to a method of and means for making products of mixed materials, such as asbestos and cement, and more particularly for making cement-asbestos shingles and wall board of the type of "transite".

Mixed asbestos and cement products have been made according to one method by mixing asbestos with a cement-water mixture in the form of a paste or putty and moulding the material into the desired shape. In many cases the cement represented about 75% of the weight of the cement-water mixture. This percentage might, however, be somewhat higher or lower. The finished articles were then obtained as a result of suitable drying and setting of the moulded material.

Articles of much superior qualities for certain purposes have, however, been produced by using a more dilute cement-water mixture in which the cement represents not to exceed 50% of the total weight, and may conveniently represent 25% which is the customary percentage used in manufacturing cement-asbestos products. Experience has shown that an artificial tile or shingle made by use of a dilute cement-water mixture is superior in mechanical strength, temperature resistance, workability, durability, lightness and other qualities, to corresponding articles made by use of cement-water paste.

It is generally understood that the advantageous characteristics of shingles and the like made from an initial dilute cement-water mixture is due to the fact that the setting and hardening of the cement are delayed and that sufficient time is given to drain from the material the water therein and to mould it into shingles or articles of other forms. The freshly moulded shingles or other products, which may be considered as only partly finished, are allowed to harden gradually. In the finished articles, the asbestos usually forms about 12% to 15% of the weight of the article, the balance being made up of cement.

In order, however, to carry out successfully the manufacture of cement-asbestos articles, it is necessary, during the preliminary stages of manufacture, to maintain in suspension the solids in the dilute mixture and later to dewater the solids, as by removing them on rotary screens. This maintenance of solids in suspension is especially difficult with regard to the granular portion, say the plus 200 mesh portion, of the cement. No such problem arises in mixtures containing 50% or more by weight of cement, inasmuch as the coarse particles do not tend to settle out under such conditions. In the use of initial dilute mixtures, this problem is met by obtaining flocculation of the cement.

With some kinds of cement, commonly classed as flocculating cements, flocculation is obtained with little trouble, whereas with other kinds of cement, classed as nonflocculating cements, suitable flocculation is not obtained by the usual methods and the manufacturing of cement-asbestos products or articles can not be carried out sucessfully in the usual manner. Accordingly, an important feature of the present invention relates to facilitating the flocculation of flocculating cements and to causing flocculation of the so-called nonflocculating cements, which do not flocculate under ordinary conditions. These results may be attained by use, during the course of manufacture, of suitable material such, for example, as sodium silicate preferably in solution. The volume of liquid which goes to make up the initial dilute slurry may be conditioned with a solution of sodium silicate or any other suitable cement-flocculating agent prior to adding the cement.

The function of the large flocs formed from satisfactory flocculating cements or from the so-called nonflocculating cements by the use of a suitable flocculating agent, is to hold up the coarse particles of cement during the separation of the cement and asbestos fibre from the water, for example, in passing over a rotary screen and the formation of a mat or felt of cement and asbestos. Subsequently such mats or felts when built up to sufficient thickness are subjected to pressure in making the finished sheet. In the absence of such large flocs the pulp does not filter well on the screen and the capacity of the apparatus drops very decidedly. Under these conditions the coarser portion of the cement (plus 200 mesh) either passes through the screen or settles out in other parts, such as the conveying and storage equipment, thereby causing a generally undesirable condition under which it is almost impossible to manufacture cement-asbestos shingles, the cement losses being very high.

Other features of the invention relate to the method of and apparatus for obtaining novel and advantageous results from suitably flocculated cement obtained as a result of the natural characteristics of the cement or by means of a suitable flocculating agent.

Heretofore the manufacture of cement-asbestos shingles has been carried out by a substantially continuous process, known as the "Dutch process" of shingle manufacture. In the apparatus used in this process, asbestos and cement are mixed with water in a beater of the type used in the paper industry. After finishing in the beater, the prepared pulp is run into a storage agitator. From the agitator the pulp is discharged into a launder from which it passes into a machine chest. Under this system a small amount of underflow from cone clarifiers to be described hereinafter is added in the launder. The machine chest or tank, which forms a part of a pulp or mat forming machine is provided with a revolving screen, on the outside surface of which the asbestos fibre and cement are filtered, the effluent water with some solids passing through the screen. The ends of the screen are sealed, so that the level of the water in the screen is substantially below the level of the pulp in the machine chest. The adhering mass of cement and asbestos passes out of the pulp, and is picked up by continuous speed belt passing over the revolving screen.

From the continuous belt the mat of cement and asbestos passes to the surface of a steel cylinder or drum on which the desired thickness of mat is built up. Upon reaching the desired thickness, the mat on the drum is cut along a depression of the drum and removed to a table. Another mat is then started on a revolving drum. The built up mat after removal from the drum is placed under a cutting press where it is cut into the size and shape desired. The individual pieces usually in the form of rectangles are sufficiently consolidated to be handled and can be stacked up and moved around without deformation. The blanks are piled up with steel plates and oiled papers arranged therebetween and subjected to a pressure of from 250 to 500 pounds per square inch. In this operation there is removed a large part of the substantially 25% of water contained by the mat as it leaves the drum. The pieces of shingle are then stored where they may dry further and cure.

The effluent from the screen, together with water used as showers and sprays on the screen and felt pass to a sump from which it is lifted by suitable means such as a centrifugal pump to the cone clarifiers already referred to. There are two cones operated in series, the overflow from the first cone passing to the second cone and the overflow from the second cone being used normally as spray and shower water on the screen and the felt. Excess overflow from the second cone is wasted and, inasmuch as there is no provision for storage between the cones and the sprays, considerable loss of overflow water may be expected.

The screen effluent contains from 0.5% to 2.5% of solids, consisting of cement and the shortest of the asbestos fibres. These solids settle relatively rapidly, and the bulk of them settle in the first cone. However, during intervals when little underflow is taken from the first cone, these solids build up and overflow into the second cone. The largest part of the solids are removed intermittently by siphon action and this underflow, normally carrying from 10 to 15% of solids, is used as make up water for a new batch in the beater. All of the solids are supposed to be returned in this manner but some of them are continuously withdrawn from the bottoms of the cones and mixed with the pulp as it passes through the launder between the storage agitator and the machine chest. Theoretically the water would be used over and over again and there would be no loss of water or material, but actually there is a loss in each case. In this connection it may be said that water may be considered as raw material, inasmuch as loss of water involves also loss of dissolved $Ca(OH)_2$ from the cement.

One great objection to the use of cones is due to the fact that the cone underflow is too dilute. This underflow is used as make up water in the beater but the quantity that can be used in this way is limited and does not carry an equivalent amount of settled solids. The solids are, therefore, continually building up in each cone and this building up continues until the cones are filled with unsettled solids, which then pass into the overflow pipe and from there into the sprays and showers where they act to blind the felt and the screen and cause troublesome operation. When these conditions exist, the main valves in the bottom of the cones are opened to allow the excess solids and water to run to the sewer and stop the discharge of these solids in the overflow.

The tendency of the solids to get into the overflow from the cones is aggravated by the method of underflow withdrawal whereby a large quantity is withdrawn at a time and material that has been hanging on the sides of the cover sloughs off in bulk. This disturbs the settling and kicks solids into suspension again, thus causing them to get into the overflow. In normal operation, the sides of the cones have to be scraped at regular intervals to free them of consolidated solids, and the cones have to be cleaned out every week.

Among the other disadvantages of the system heretofore in use, the operation of the cones is very inefficient and their arrangement in connection with the rest of the apparatus causes poor operation throughout the plant, the underflow varies in consistency, the overflow contains solids that blind the screen and felt, there is loss of water and solids from the system, and the variations in the quality and quantity of the products from the cones tend to produce variations in the entire process resulting in difficulties in operation and in loss of production.

Other important features of the invention relate to means for overcoming the above mentioned and other disadvantages of the apparatus heretofore in use. According to one form of carrying out these features of the invention, the cones are replaced by a thickener of the "Dorrco" type, the underflow is passed (preferably by pumping) into a storage tank which may be provided with stirring mechanism, and the relatively clear overflow is passed into a second storage tank. From the underflow storage tank, the settled solids therein and the remaining liquid pass to the beater where fresh asbestos and cement are added. The flocculating agent may also be added at this point. Preferably the beater is one adapted for continuous operation. The clarified water from the overflow storage tank is utilized for sprays and showers acting on the screen and felt also for thinning the mixture passing from the beater to the screen.

Among the advantages of the improved apparatus are (1) substantially no loss of water or material; (2) clear water for the showers and sprays; (3) uniform underflow density of the recovered solids; (4) smoother operation of the plant with no loss of time due to clarification operations. In this connection it may be stated that fresh water will not be satisfactory for a spray on the felt; in that it will cause the information of a film on the felt. With the proper operation, the only fresh water needed to be added is that required to make up for evaporation or water passing out of the system with the shingles when they leave the hydraulic press.

Other features and advantages will appear upon consideration of the following description and of the drawing which is a diagrammatic elevation of one embodiment of apparatus for carrying out the present invention.

Referring to the drawing, 10 designates a beater in which Portland cement from a hopper 11 and asbestos from a hopper 12 are mixed with water. From the beater the water, with cement and asbestos in suspension therein, flows through a pipe 13 into a storage agitator 14, including a tank 15 and a rotary device 16 having a vertical shaft 17. This shaft may be driven in any suitable manner as, for example, a bevel gear 18 at the upper end thereof and a bevel gear 19 meshing therewith and mounted on a shaft 20 connected with any suitable source of power. Preferably the flow of material through the pipe 13 is controlled by a valve 13a.

From the storage agitator 14, the mixture or slurry flows through a pipe 21 under control of a valve 22 into a mixing feed launder 23 and thence into a machine chest 24. The machine chest comprises a tank 25 in which rotates a machine cylinder or screen 26 of which the ends are sealed. The cylinder 26 is driven by means including a shaft 27 on which it is mounted. The fibre and cement are filtered out on the outside of the screen and the effluent water with some solids passes through the screen and is drained through a pipe 28 into a sump 29. It will be seen that the level of the water in the screen is substantially below the level of the pulp in the tank of the machine chest.

The mat of cement and asbestos adhering to the screen 26 passes out of the pulp and is picked up by a continuous felt or belt 30 passing over the screen and traveling in the direction indicated by the arrow associated therewith. The belt 30 is guided in a suitable manner as by guide rollers 31. The mat is carried by the belt to a cylinder or drum 32, preferably of steel, and is built up to the desired thickness.

When the desired thickness of mat is built up on the drum, the mat is cut along a depression 33 in the drum and removed to a table 34. Another mat is then started and the first mat is treated in the usual manner including the steps of pressing and curing. Any water pressed out of the mats is drained into the sump 29 through a duct or passage 35.

The parts of the apparatus hereinbefore described correspond in general to parts of apparatus heretofore in use. The illustrated means for handling the effluent and all water from the sump is, however, different from that used in the apparatus formerly in use and enables the operations to be carried out with very slight loss of water and material. In place of the cone clarifiers, there is provided a thickener 36, which may be of the "Dorrco" type, and the material in the sump 29 is supplied thereto through a pipe 37 by means of a centrifugal pump 38 immersed in the material in the sump and actuated preferably by means of a motor 39 on a shaft 40 which is common to the pump and the motor. The material pumped through the pipe 37 is discharged into the tank 41 of the thickener through a central feedwell 42 which extends below the normal liquid level in the tank and reduces the disturbance at the surface of the liquid.

The tank 41 has the usual form of bottom 43 with its upper surface slanting inwardly to a central outlet 44 from which the settled solids mixed with a sufficient amount of water are drawn off through a pipe 45 by suitable means, such as a "Dorrco" diaphragm pump 46, and discharged into a storage device or tank 47 from which material is supplied, through a pipe 47a controlled by a valve 47b, to the beater 14 for mixing with fresh cement and asbestos. The thickener also includes a usual revolving rake structure 48 by which the settled solids are gradually worked toward the central outlet 44. Preferably the rake structure is driven by means including a central vertical shaft 49 extending upwardly through the feedwell 42, a worm wheel 50 fixed on the shaft 49 to drive the same, and a worm 51 driven from any suitable source of power. The tank 47 is also provided with a rotary agitator 52 driven through its shaft 53 by means including a bevel gear 54 on the shaft 53, and a bevel gear 55 on a driving shaft 56.

The clear liquid or water overflows into a peripheral discharge launder 57 and flows therefrom through a pipe 58 to a clarified-water storage tank 59. Part of the water in this tank is used as make-up water in the beater 10 and is supplied thereto through a pipe 60 under control of a valve 61, another part is used for clear water dilution of material in the mixing feed launder 23 and is supplied thereto through a pipe 62 under control of a valve 63, and another part is supplied through a pipe 64 under control of a valve 65 to a spray or shower 66 for the screen 26 and sprays or showers 67 for the felt or belt 30. The spray 66 may also be under control of a separate valve 68. It should be understood that all drainage from the showers flows into the sump 29.

With the make-up of the apparatus as shown, the beater action is made continuous. This continuous action may be obtained by the illustrated form of beater 10, in which there is a tank 70 having one or more screens 71 arranged at the lateral wall of the tank. Each screen 71 separates the material at the interior of the tank from a pocket arranged just at the outside of the screen and the material is forced against the screen by liquid supplied through one or more nozzles 72 by suitable means such as a pump 73 drawing liquid from the pocket through a pipe 75. The streams from these nozzles 72 act to break up the asbestos and to force it through the screen when sufficiently fine. The asbestos in the beater, when of the requisite fineness, passes through the screen or screens 71 and through the pipe 13, under control of the valve 13 a, to the storage agitator 14.

The flocculating agent, preferably sodium silicate in solution, is introduced into the tank 70 of the beater 10 by suitable means which may include a supply line 76 and a pump or dosing device 77. By such introduction of the flocculating agent in requisite proportion with reference to the other material, the flocculation of the so-called flocculating cements is facilitated and flocculation of the so-called non-flocculating cements is effected. It is found desirable to introduce the flocculating agent into the beater before introducing the cement.

The storage device or tank 47 makes it possible to avoid waste of underflow from the thickener even when the beater is not of a continuous type. Also the use of the agitator 52 is optional in connection with the tank 47. In the event that a continuous beater, such as shown and described, is used, the storage device 47 may even be eliminated without seriously affecting the working of the system or the quality of the product.

It will be evident that the process of the present invention has many advantages over those heretofore in use. For example, cheaper grades of cement may be used, the difficulties in obtaining suitable cement are avoided, and the loss of material is decreased. Many advantages of the present apparatus over those heretofore in use will also be evident.

It should be understood that changes may be made and that certain features may be used without others without departing from the true scope and spirit of the invention.

Having thus described my invention, I claim:

1. In a process adapted for manufacture of cement-asbestos products by use of a dilute initial slurry, the step of conditioning such slurry by means of a flocculating agent.

2. In a process adapted for manufacture of cement-asbestos products by use of a dilute initial slurry, the step of conditioning such slurry by means of a flocculating agent.

3. In a process adapted for manufacture of cement-asbestos products by use of a dilute initial slurry, the step of conditioning such slurry to produce flocculation of material therein.

4. In a process adapted for manufacture of cement-asbestos products by use of a dilute initial slurry, the step of conditioning such slurry by use of a soluble flocculating agent.

5. In a process adapted for manufacture of cement-asbestos products by use of a dilute initial slurry, the steps of adding to the liquid to be used a flocculating agent, and of adding to the liquid containing said flocculating agent the other ingredients of the slurry.

6. In a process adapted for manufacture of cement-asbestos products by use of a dilute initial slurry containing cement, the step of conditioning said slurry by addition of sodium silicate.

7. In a process adapted for manufacture of cement-asbestos products by use of a dilute initial slurry containing so-called non-flocculating cement, the step of flocculating said cement by addition of a solution of sodium silicate.

8. In a process adapted for manufacture of cement-asbestos products by use of a dilute initial slurry, the steps of adding a flocculating agent to the liquid to be used and adding cement for flocculation by said agent.

9. In a process adapted for manufacture of cement-asbestos products by use of a dilute initial slurry, the steps of adding a flocculating agent to the liquid to be used, and of adding cement in an amount representing as a maximum fifty per cent of the total weight of the mixture.

10. In a process adapted for manufacture of cement-asbestos products by use of a dilute initial slurry, the steps of adding a flocculating agent to the liquid to be used, and of adding cement in an amount representing approximately twenty-five per cent of the total weight of the mixture.

11. In a process adapted for manufacture of shingles and the like by use of a dilute initial slurry, the steps of adding sodium silicate to the liquid to be used, of adding cement in an amount representing as a maximum fifty per cent of the total weight of the mixture, and of adding a requisite amount of asbestos fibre.

12. In a process adapted for manufacture of shingles and the like by use of an initial dilute slurry, the steps of adding a solution of sodium silicate to the liquid to be used, of adding cement in an amount representing approximately twenty-five per cent of the total weight of the mixture of said liquid therewith, and of adding a requisite amount of fine asbestos fibre.

13. In a process adapted for manufacture of shingles and the like by use of an initial dilute slurry, the steps of adding a solution of sodium silicate to the liquid to be used, of adding cement in an amount representing approximately twenty-five per cent of the weight of the mixture of said liquid therewith, of adding a requisite amount of asbestos fibres, of dewatering the solids in the mixture, of clarifying the liquid thus obtained to recover remaining solids, and of again using the clarified liquid and the solids recovered therefrom.

14. In apparatus of the character described, the combination with a beater, a storage agitator receiving material from the beater, a mixing launder receiving material from the storage agitator, a filtering device receiving material from said mixing launder, said filtering device including a rotatable screen, and a felt to strip from the screen the mat formed thereon; of a continuously acting thickener receiving filtered liquid from said rotating screen, means for feeding the underflow from the thickener to said beater, a tank receiving clarified liquid from the overflow of said thickener, and means for supplying requisite quantities of clarified liquid from such tank to the beater and the mixing launder.

15. In apparatus of the character described, the combination with a beater, a storage agitator receiving material from the beater, a mixing launder receiving material from the storage agitator, a filtering device receiving material from said mixing launder, said filtering device including a rotatable screen, a felt to strip from the screen the mat formed thereon; and sprays to clear said screen and said felt; of a continuously acting thickener receiving filtered liquid from said rotating screen, means for feeding the underflow from the thickener to said beater, a tank receiving clarified liquid from the overflow of said thickener, and means for supplying requisite quantities of clarified liquid from such tank to the beater, the mixing launder, and the sprays.

16. In apparatus of the character described, the combination with a beater, a storage agitator receiving material from the beater, a mixing launder receiving material from the storage agitator, a filtering device receiving material from said mixing launder, said filtering device including a rotatable screen, and a felt to strip from the screen the mat formed thereon; of a continuously acting thickener receiving filtered liquid from said rotating screen, a storage device, means for feeding the underflow from the thickener to such storage device, means for feeding material from the storage device to the beater, a tank receiving clarified liquid from the overflow of said thickener, and means for supplying requisite quantities of clarified liquid from such tank to the beater and the mixing launder.

17. In apparatus of the character described, the combination of a continuous beater, a storage agitator receiving material from the beater, a mixing launder receiving material from the storage agitator, a filtering device receiving material from said mixing launder, said filtering device including a rotatable screen, a felt to strip from the screen the mat formed thereon, a continuously acting thickener receiving filtered liquid from said rotating screen, means for feeding the underflow from the thickener to said beater, a tank receiving clarified liquid from the overflow of said thickener, and means for supplying requisite quantities of clarified water from such tank to the beater and the mixing launder.

In testimony whereof I have affixed my signature to this specification.

ERNEST J. MAUST.